UNITED STATES PATENT OFFICE.

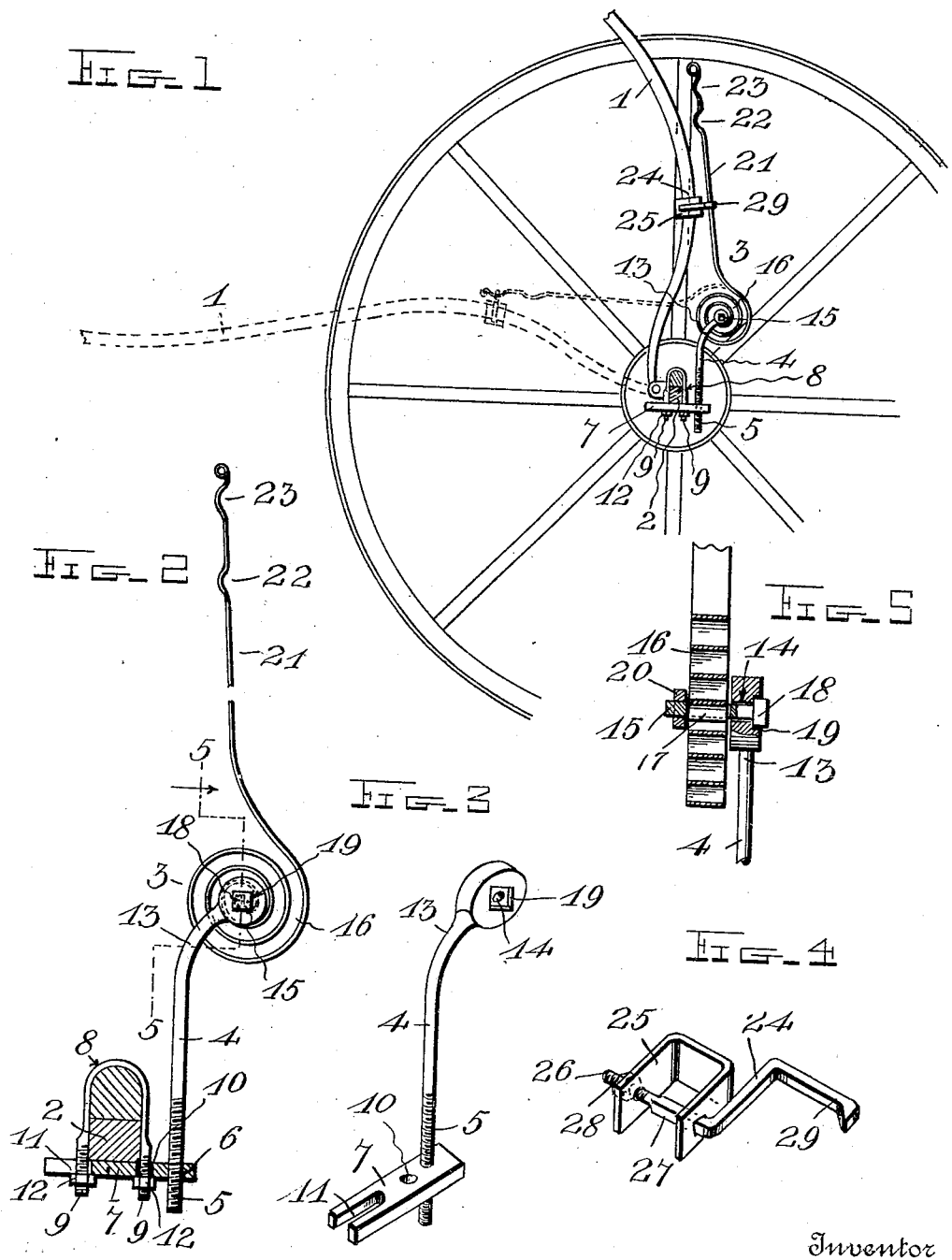

HENRY WILLIAM DAVIS, OF PROVO, UTAH.

SHAFT-SUPPORT.

No. 823,320.   Specification of Letters Patent.   Patented June 12, 1906.

Application filed September 18, 1905. Serial No. 278,982.

*To all whom it may concern:*

Be it known that I, HENRY WILLIAM DAVIS, a citizen of the United States, residing at Provo city, in the county of Utah and State of Utah, have invented certain new and useful Improvements in Shaft-Supports; and I do declare the following to be a full, clear, and exact description of the invention, such as will enable others skilled in the art to which it appertains to make and use the same.

My invention relates to improvements in devices for supporting the shafts or thills of vehicles in either their vertical or elevated position when not in use or their normal horizontal position when a draft-animal is hitched thereto.

The object of the invention is to provide a device of this character which will be simple in construction, comparatively inexpensive to manufacture, durable in use, and adapted to be readily applied to vehicles of any kind and size.

With the above and other objects in view the invention consists of certain novel features of construction, combination, and arrangement of parts, as will be hereinafter more fully described and claimed.

In the accompanying drawings, Figure 1 is a view of a portion of a vehicle, showing my improved shaft or thill support applied thereto, the shafts or thills being in their elevated position in full lines and in their lowered or horizontal position in dotted lines. Fig. 2 is a detail sectional view through the axle, showing the manner in which the device is adjustably clamped thereon. Fig. 3 is a perspective view of that portion of the device which is mounted upon the axle; and Fig. 4 is a similar view of that part of the device which is mounted upon the shaft or thill.

Referring to the drawings by numeral, 1 denotes a shaft or thill which is coupled to an axle 2 in the usual manner and is adapted to be supported in either its elevated or lowered position by my improved support 3. The latter consists of two parts, one being carried by the axle and the other by the shaft or thill. The part which is attached to the axle 2 comprises an upright arm 4, which has its lower screw-threaded end 5 adjustable vertically in a screw-threaded opening 6, formed in a yoke-plate 7. The latter is adjustably secured upon the axle 2 by a substantially U-shaped bolt or clip 8, which has its screw-threaded ends 9 passed through openings 10 and 11, formed in the plate or yoke 7 and engaged by the usual clamping-nuts 12. The opening 10, which is arranged adjacent to the screw-threaded openings 6 is circular in form and the opening 11 is in the form of a longitudinally-disposed slot, so that the clip or U-bolt 8 may be used, together with the yoke 7, upon axles of any size. The upper end 13 of the arm 4 is preferably bent or curved rearwardly and formed with an enlargement in which is provided an aperture or opening 14. Projecting through the latter is a bolt or stud 15, to which is secured one end of a coiled spring 16. The connection of the spring and bolt 15 is preferably effected by forming the latter with a slot to receive the bent end 17 of said spring. The bolt 15 is mounted in the opening 14, so that it cannot rotate therein except when it is desired to wind up or adjust the tension of the spring 16. This connection may be effected in any suitable manner; but it is preferably done by providing a square or polygonal-shaped shoulder 18 upon the inner face of the head of the bolt and engaging said shoulder with a similar-shaped recess 19, formed in the adjacent face of the enlargement 13 of the arm 4. Upon the opposite screw-threaded end of the bolt 15 may be provided a nut 20 to hold the enlargement 18 in the recess 19. The outer or free end 21 of the spring 16 is substantially straight with seats 22 and 23, which are formed therein by bending or curving it transversely to a slight extent, as shown. This end 20 of the spring is adapted to be engaged by a projection or bracket-arm 24, which is adjustably secured upon the shaft or thill 1. This projection or bracket is preferably formed by a U-shaped clip 25 and a bolt 26, which has one end of its body bent at right angles, as at 27, and projecting through alining openings in the ends or arms of the clip 25 and screw-threaded to receive a clamping-nut 28, which secures the device to shaft or thill 1, and at its opposite end a right-angularly-bent hook-shaped portion 29, which is adapted to engage the end 20 of the spring 16, as clearly shown in Fig. 1 of the drawings. When the shaft or thill 1 is in its elevated position, as shown in full lines in Fig. 1, the projection or hook 29 is engaged with the lower portion of the end 20 of the spring, and when the shaft or thill is in its lowered or horizontal position said projection or hook 29 is engaged with one of the seats 22 23 in the outer portion of said end 20.

The construction, use, and advantages of the invention will be readily seen from the foregoing description, taken in connection with the accompanying drawings. It will be noted that the device will support the shaft in either its horizontal or elevated position and that it may be quickly and easily applied to any-sized buggy, delivery-wagon, or other vehicle.

Various changes in the form, proportion, and the minor details of construction may be resorted to without departing from the principle or sacrificing any of the advantages of the invention.

Having thus fully described my invention, what I claim as new, and desire to secure by Letters Patent, is—

1. The combination with a vehicle-axle and a shaft or thill, of a clip on the axle, a vertical arm supported by the clip, a spring-arm having a spring-coil at its inner end connected to and supported by the said vertical arm, and a projection on the shaft or thill to engage the free end of said spring-arm, substantially as described.

2. The combination with a vehicle-axle and a shaft or thill, of a clip adjustably secured upon said axle, an adjustable screw-threaded engagement with said clip, a bolt or stud adjustable in one end of said arm, a coiled spring having its inner end connected to said bolt and a projection or hook upon said shaft or thill adapted to engage the free end of said spring, substantially as described.

3. The combination with a vehicle-axle and a shaft or thill, of a U-shaped bolt engaged with said axle, a yoke or clip having an opening and a slot to receive the ends of said bolt, nuts upon the ends of said bolt, an arm having its lower screw-threaded end adjustable in a threaded opening in said yoke, a coiled spring having its inner end connected to the upper portion of said arm, and a projection or hook upon said shaft or thill adapted to engage the free end of said spring to support said shaft or thill in either its elevated or lowered position, substantially as described.

In testimony whereof I have hereunto set my hand in presence of two subscribing witnesses.

HENRY WILLIAM DAVIS.

Witnesses:
   GRANT C. BAGLEY,
   W. H. RAY.